Figure 1:
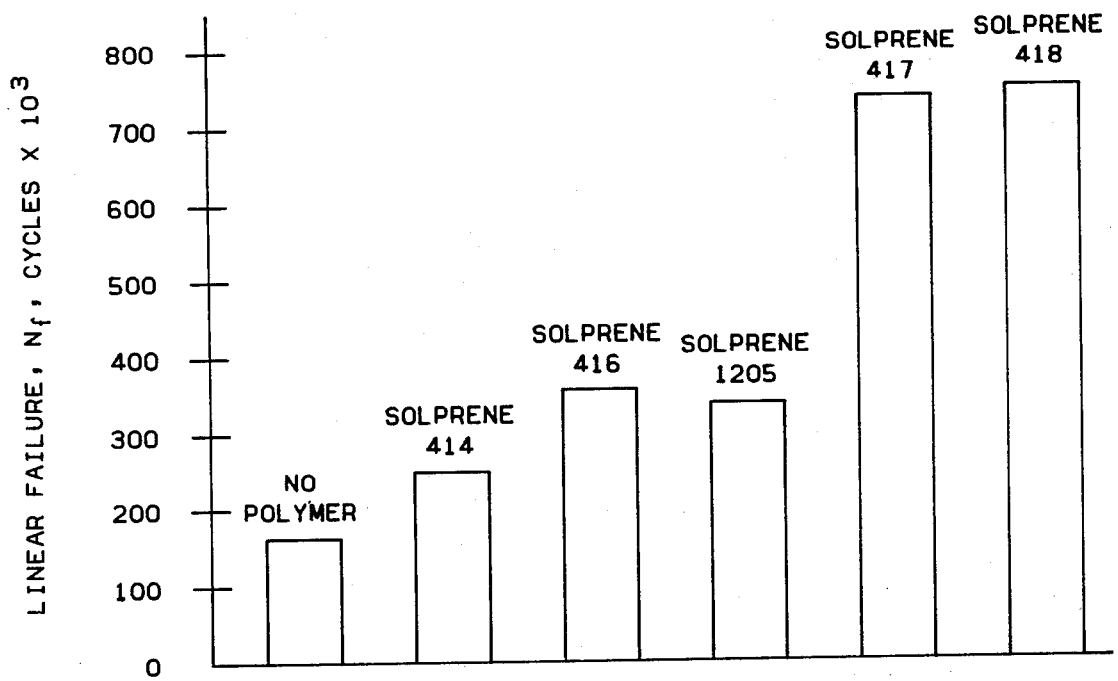

United States Patent [19]

Bresson

[11] 4,217,259

[45] Aug. 12, 1980

[54] ASPHALTIC CONCRETE COMPOSITIONS COMPRISING DIENE/VINYL AROMATIC COPOLYMERS

[75] Inventor: Clarence R. Bresson, Bartlesville, Okla.

[73] Assignee: Phillips Petroleum Company, Bartlesville, Okla.

[21] Appl. No.: 838,341

[22] Filed: Sep. 30, 1977

[51] Int. Cl.$^2$ ............................................. C08L 91/00
[52] U.S. Cl. ..................... 260/28.5 AS; 260/28.5 B; 260/42.43
[58] Field of Search ................... 260/28.5 AS, 28.5 B, 260/42.43

[56] References Cited

U.S. PATENT DOCUMENTS

| | | | |
|---|---|---|---|
| 3,763,074 | 10/1973 | Rostler | 260/29.7 GP |
| 3,778,397 | 12/1973 | Gannon et al. | 260/28.5 AS |
| 3,900,692 | 8/1975 | Rostler | 260/28.5 AS |

FOREIGN PATENT DOCUMENTS 740027  8/1966  Canada ............... 260/28.5 AS

*Primary Examiner*—Melvyn I. Marquis

[57] ABSTRACT

Improved asphalt-containing compositions having excellent flexural fatigue test characteristics are prepared by incorporating into the mix during its preparation at least one diene/vinyl aromatic copolymer, said copolymer being a radial teleblock copolymer wherein the teleblock copolymer has a diene/vinyl aromatic weight ratio of about 60/40 to about 90/10 and a weight average molecular weight range of from about 130,000 to 300,000.

21 Claims, 2 Drawing Figures

ASPHALTIC CONCRETE COMPOSITIONS COMPRISING DIENE/VINYL AROMATIC COPOLYMERS

This invention relates to improved asphaltic concrete compositions. More specifically, the invention relates to an asphalt-containing concrete composition exhibiting excellent flexural fatigue test characteristics or data. In one of its concepts, the present invention provides an asphaltic concrete composition exhibiting good flex life characteristics by incorporating into the composition as prepared a diene/vinyl aromatic copolymer as defined below. In another of its concepts, in a now preferred form, such a composition is prepared by premixing the copolymer and asphalt prior to admixing with the thus-obtained mixture the aggregate portion of the final composition. According to a further concept of the invention, the copolymer and asphalt are premixed at least until a homogeneous dispersion has been obtained. More specifically, a further concept of the invention involves admixing with an asphalt as described herein a radial teleblock copolymer, prepared by using 1,3-butadiene or isoprene or mixtures thereof as conjugated diene and styrene as a monovinyl aromatic monomer. The copolymerization is completed with a coupling agent, e.g., silicon tetrachloride or polyepoxide.

The radial teleblock copolymer used in the invention in its broadest form will have a diene/styrene weight ratio in the approximate range of from about 60/40 to about 90/10 and will have a weight average molecular weight range of from about 50,000 to about 500,000. More specifically, the now preferred very much better acting copolymer will have a diene/styrene weight ratio in the approximate range of 80/20 to 85/15 and a weight average molecular weight in the approximate range of 150,000 to 300,000.

For years, asphaltic concrete has been a major paving material for highways, streets, parking lots, and airport runways. Although not as durable as ordinary concrete, asphaltic concrete has enjoyed wide popularity because of its hard-like character, ease of application, and low cost. In spite of these advantages, asphaltic concrete has some disadvantages that have limited its wider usage such as: it softens in very hot weather, becomes brittle in cold weather, permits water to slowly penetrate, and it cracks when subjected to heavy traffic. Several attempts have been made to solve these problems, the most notable of which has been the addition of polymeric-type materials like conventional SBR, nitrile, or butadiene-base polymers at the three to five weight percent level of polymer in asphalt; conventional asphaltic concrete typically contains five to seven percent asphalt. Even though these polymers solved or minimized some of the earlier problems, they themselves frequently contributed to additional problems such as: increased bulk viscosity, making it more difficult to apply asphaltic concrete polymer compositions by conventional methods, gel formation, and incompatibility.

Not all of the above difficulties have been solved, although many have been considerably reduced. Investigators have continually sought to develop asphaltic concrete compositions that have a longer service life, thereby reducing maintenance and installation costs. Many of these efforts have been directed toward improving the resistance to stress (fatigue) or cracking, a major performance property sought by most manufacturers and users of asphaltic concrete.

The composition of the invention is found to possess extended service life, that is, an asphaltic concrete pavement or other similar type application will have a longer service life and a reduced maintenance cost. Generally, a composition according to the invention will comprise a mineral aggregate, asphalt, and a radial teleblock diene/monovinyl aromatic copolymer, all of which are blended and which can be applied in a conventional manner as a hot mix.

An object of this invention is to provide an asphaltic concrete composition. It is another object of this invention to provide an asphaltic concrete composition having improved service life. It is a still further object of this invention to provide an asphaltic composition exhibiting improved flexural fatigue test characteristics or properties.

Other aspects, concepts, objects, and the several advantages of this invention are apparent from a study of this disclosure and the appended claims.

According to the present invention, there is provided an asphaltic concrete composition exhibiting improved flex life and, therefore, service life characteristics comprising an asphalt, a radial teleblock copolymer of a conjugated diene and a vinyl aromatic compound, as herein defined, and a mineral aggregate.

Still according to the present invention, there is provided a composition as herein described wherein the copolymer and the asphalt are preblended to produce a homogeneous dispersion before the aggregate is then admixed with the dispersion.

ASPHALT

The asphalt which can be employed in this invention includes conventional petroleum asphalts, natural asphalts, Gilsonite, air-blown asphalts, coal tar, and other such similar type materials. The asphalts can be characterized by having penetration grades of up to 300 as measured by ASTM Method D5. Currently preferred asphalts include air-blown asphalt of approximately 25-200 penetration grade and conventional petroleum asphalts of approximately 25 to 250 penetration grade.

RADIAL TELEBLOCK COPOLYMERS

Radial teleblock copolymers useful in the rubberized asphaltic concrete compositions of the invention include those based on about 60-90 parts by weight of conjugated diene/40-10 parts by weight of monovinyl aromatic, the preparation of which is fully described in U.S. Pat. Nos. 3,281,383, Robert P. Zelinski and Henry L. Hsieh, issued Oct. 25, 1966, and 3,639,521, Henry L. Hsieh, issued Feb. 1, 1972. The disclosures of these patents are incorporated herein by reference to them.

In U.S. Pat. No. 3,639,521 the following disclosure is given and is applicable to the present invention.

The radial block polymer used in this invention can in a broad sense be depicted as an $(A-B)_xY$ type polymer or as $(A-B-A)_xY$ wherein A represents a non-elastomeric polymer block or segment and B represents an elastomeric polymer segment. Y is an atom or group of atoms derived from the polyfunctional treating agent used in the formation of the radial polymers and x represents the number of functional groups of said polyfunctional treating agent and is an integer of at least 3.

The radial block polymers are produced by incremental addition of monomers with the additional step of adding a polyfunctional treating agent to the polymerization mixture after the polymerization has been completed but prior to the inactivation of the polymerization initiator.

Thus a radial block polymer can be characterized as having at least three polymer branches with each branch of the radial block polymer comprising terminal non-elastomeric segments.

The branches of the radial block polymer contain a terminal non-elastomeric segment and at least a second elastomeric polymer segment joined thereto. The branches can also contain a third segment of non-elastomeric polymer.

The polymer branch lastly described would then be identical to the aforedescribed linear block polymers of this invention. Coupling the linear block polymer with the polyfunctional treating agent having at least three functional groups thus forms one type of radial polymer. The most common types, however, of radial block polymers prepared according to this invention contain only a terminal non-elastomeric segment and an elastomeric segment.

The non-elastomeric terminal segment of the radial block polymer comprise homopolymers made from monovinyl-substituted aromatic hydrocarbons containing from about 8 to 18 carbon atoms per molecule as well as copolymers including both random and block, comprising at least 70 percent by weight of one or more polymerized monovinyl-substituted aromatic hydrocarbon monomers such as a-, or β-unsaturated nitriles and esters of acrylic and methacrylic acid.

The elastomeric segment of the raidal polymer branch comprises polymers prepared from conjugated dienes containing from about 4 to 12 carbon atoms per molecule as well as copolymers including both random and block thereof, comprising at least 70 percent by weight of one or more polymerized conjugated diene monomers and not more than 30 percent by weight of one or more of said polymerized polar monomers or said monovinyl-substituted aromatic hydrocarbon monomers.

Thus the radial teleblock copolymers useful in this invention are represented by the formula $(AB)_x Y$ or $(ABA)_x Y$ wherein A is a polyvinyl-substituted aromatic block segment containing 8 to 18 carbon atoms per molecule; B is a polyconjugated diene block segment containing 4 to 12 carbon atoms per molecule. Y is an atom or group of atoms derived from the polyfunctional treating agent used in the formation of the radial polymers and x represents the number of functional groups of said polyfunctional treating agent and is an integer of at least 3.

The now preferred radial teleblock copolymers are those prepared using 1,3-butadiene or isoprene or mixtures thereof as conjugated diene, styrene as monovinyl aromatic monomer, and silicon tetrachloride or polyepoxides as coupling agents. The physical characteristics of copolymers used in this invention, including the controls, are shown as follows:

| Trade Name | Polymer Type | Diene/Styrene Ratio | Coupling Agent | Molecular Wt., Wt. Average, $M_w$ |
|---|---|---|---|---|
| Runs According to the Invention | | | | |
| Solprene® 1205 | Linear Block | 75/25[a] | none | 87,000 |
| Solprene® 414 | Radial Teleblock | 60/40[a] | SiCl$_4$ | 130,000 |
| Solprene® 416 | Radial Teleblock | 70/30[a] | SiCl$_4$ | 140,000 |
| Preferred Runs According to the Invention | | | | |
| Solprene® 417 | Radial Teleblock | 80/20[a] | SiCl$_4$ | 190,000 |
| Solprene® 418 | Radial Teleblock | 85/15[b] | SiCl$_4$ | 300,000 |

[a]Diene is 1,3-butadiene
[b]Diene is isoprene.
Solprene is a registered trademark of the Phillips Petroleum Company.

AGGREGATE

Aggregate materials used in this invention include such as chat, sand, screened pebbles or rock, and the like. The particle size of this aggregate varies depending upon application. For paving applications which are the major area of interest for the present invention, individual states and localities have their own specifications which define the aggregate as a mixture of various particle size (sieve) materials combined such that the amount of void spaces varies from 3–25 percent. For most highway and street paving, a six percent void is generally considered normal. A typical distribution of aggregate size used in road surfacing is shown as follows:

| | Aggregate Distribution[1] | | |
|---|---|---|---|
| Mixture Recommended Use | Type A Base or Binder | Type B Binder or Surface | Type C Leveling or Surface |
| Sieve Size | Percent by Weight Passing | | |
| 3.81 cm (1½ inch) | 100 | | |
| 2.54 cm (1 inch) | 80–100 | | |
| 1.90 cm (¾ inch) | | 100 | |
| 1.27 cm (½ inch) | 60–80 | 80–100 | 100 |
| 0.95 cm (⅜ inch) | | 70–90 | 80–100 |
| No. 4 | 40–55 | 50–70 | 55–75 |
| No. 10 | 30–45 | 35–50 | 40–55 |
| No. 40 | 15–30 | 15–30 | 18–33 |
| No. 80 | 8–20 | 10–20 | 10–22 |
| No. 200 | 2–8 | 3–9 | 4–10 |

[1]Standard Specifications for Highway Construction, Edition of 1967, Oklahoma State Highway Commission.

PROPORTIONS OF COMPONENTS OF ASPHALTIC CONCRETE COMPOSITION

The components of asphaltic concrete compositions of the invention generally will be employed in the amounts given in the following table:

| | Weight Percent | |
|---|---|---|
| Ingredient | Broad | Preferred |
| Mineral Aggregate | 96.95–77.0 | 95.3–91.2 |
| Asphalt | 3.0–20.0 | 4.5–8.0 |
| Radial Teleblock Copolymer | 0.06–3.0 (2–15 parts per hundred asphalt) | 0.20–0.80 (5–10 parts per hundred asphalt) |

PREPARATION OF ASPHALTIC CONCRETE COMPOSITIONS

In the preparation of a composition of the invention, it is now generally desirable to premix the radial teleblock copolymer and asphalt prior to mixing the aggregate. The premixing of the asphalt and copolymer can be accomplished using any desired procedure to produce a homogeneous dispersion. For the tests described below, the asphalt and copolymer were blended in a sigmoid blade type mixer such as a Day Mixer at about 204° C. (400° F.) for at least two to four hours or until the mixture is homogeneous as judged by visual observation.

The following table illustrates the variations in mixing times with different radial teleblock copolymers in two different lots of the same grade asphalt. The blends prepared in 5 kg lots contain five weight percent copolymer.

| Asphalt A (85–100 Pen) | | Asphalt B (85–100 Pen) | |
|---|---|---|---|
| Polymer | Mix Times (hrs.) | Polymer | Mix Times (hrs.) |
| Solprene ® 416 | 2 | Solprene ® 417 | 3.8 |
| Solprene ® 1205 | 3.5 | Solprene ® 418 | 3.5 |
| Solprene ® 414 | 2.75 | | |
| Solprene ® 417 | 5 | | |
| Solprene ® 418 | 4.2 | | |

The asphaltic concrete composition of this invention ordinarily is prepared by mixing the asphalt-radial teleblock copolymer premix and the aggregate in any manner which produces an asphaltic concrete composition having the desired properties. On a laboratory scale, it is preferred to preheat the asphalt-copolymer premix and aggregate to about 148°–163° C. (300°–325° F.) for about 18–24 hours for conditioning after which the components are weighed according to desired amounts and mixed for two minutes in a preheated 135° C. (275° F.) pug mill mixer. The hot mix is transferred to an 18-inch circular mold and compacted for laboratory flexural fatigue testing. The amount of materials charged depends on the thickness of the specimen desired and is shown as follows.

| Specimen thickness | 5.08 cm (2.0 in.) | 4.06 cm (1.6 in.) | 3.56 cm (1.4 in.) | 3.18 cm (1.25 in.) |
|---|---|---|---|---|
| Aggregate (<1.27 cm, ½ inch) | 13,765 g | 10,325 g | 9,035 g | 8,065 g |
| Sand | 4,590 g | 3,440 g | 3,010 g | 2,690 g |
| Asphalt/Copolymer | 1,005 g | 755 g | 660 g | 590 g |

Asphaltic concrete compositions described herein can be applied as a hot mix for pavement and other similar hard surfaced applications using conventional asphaltic concrete equipment. The method of application is similar to that used for asphaltic concrete compositions containing no added polymer which is known to those skilled in the art.

EXAMPLE I

The asphaltic concrete compositions described herein were prepared in accordance with the following recipe:

| Component | Parts by Weight |
|---|---|
| Aggregate (0.95 cm, ⅜ in. and less) | 71.11 |
| Sand | 23.69 |
| Asphalt | 4.94 |
| Copolymer | 0.26 |
| | 100.00 |

The aggregate and sand employed in the above recipe had a particle size distribution as follows:

| | Weight Percent Passing Through Sieve | | | | | |
|---|---|---|---|---|---|---|
| Sieve Size | 0.95 cm ⅜ in. | No. 4 | No. 10 | No. 40 | No. 80 | No. 200 |
| Aggregate | 70.4 | 34.0 | 20.6 | 10.7 | 9.0 | 8.0 |
| Sand | 25.0 | 25.0 | 24.4 | 19.7 | 2.3 | 0 |
| Total | 95.4 | 59.0 | 45.0 | 30.4 | 11.3 | 8.0 |

The asphalt and copolymer were premixed in a sigmoid blade mixer (Day Mixer) at 204° C. (400° F.) for at least about two to four hours. The aggregate and asphalt/copolymer were heated to 148.9° C.–162.8° C. (300°–325° F.) for about 18 hours, transferred to a preheated (135° C./275° F.) laboratory type pug mill and mixed for two minutes. The hot mix was transferred to an 18-inch circular mold and compacted for four minutes such that about 181.6 kg (400 lbs.) load was generated on the surface of the specimen. The specimen thickness was 4.06 cm (1.6 inch). After allowing the specimen to condition at ambient room temperature for five days, flexure fatigue testing was conducted in accordance with ASTM Special Publication STP 508 "Fatigue of Compacted Bituminous Aggregate Mixtures" by R. A. Jimenez, July, 1972. Flexure Fatigue testing is briefly described as the number of rapidly repeated stresses (cycles) conducted on an asphaltic concrete sample before significant cracks or failures are detected.

The following tables and figures contain evaluation data obtained on asphaltic concrete compositions prepared according to this invention. The figures show visually, for ready comparison, some of the data from the tables, i.e., the flexure data.

TABLE I

| | | Flexural Fatigue Test Data on Polymer Additives in Asphalt A | | | | | |
|---|---|---|---|---|---|---|---|
| Specimen No. | Additive[a] | Thickness cm (in) | Radial Stress[b] MPa - Avg. | | psi - Avg. | Linear Failure, $N_f$ Cycles × $10^3$ - Avg. | Improvement[d] Factor, Avg. |
| 1 | None | 4.06(1.60) | 0.848 | | 123 | 105 | |
| 2 | " | 4.01(1.58) | 0.869 | 0.855 | 126 | 185 | 156 — |
| 3 | " | 4.06(1.60) | 0.848 | | 123 | 145 124 | |
| 4 | " | 4.06(1.60) | 0.848 | | 123 | 190 | |
| 5 | Solprene ® 414 | 4.04(1.59) | 0.855 | | 124 | 220 | |
| 6 | Solprene ® 414 | 4.01(1.58) | 0.869 | 0.862 | 126 | 360 | 252   1.6 |
| 7 | Solprene ® 414 | 4.06(1.60) | 0.862 | | 125 | 175 125 | |
| 8 | Solprene ® 416 | 4.04(1.59) | 0.855 | | 124 | 390 | |

TABLE I-continued

Flexural Fatigue Test Data on Polymer Additives in Asphalt A

| Specimen No. | Additive[a] | Thickness cm (in) | Radial Stress[b] MPa - Avg. | | Radial Stress[b] psi - Avg. | | Linear Failure, $N_f$[c] Cycles × 10³ - Avg. | | Improvement[d] Factor, Avg. |
|---|---|---|---|---|---|---|---|---|---|
| 9  | Solprene® 416  | 4.04(1.59) | 0.855 ⎫ | 0.848 | 124 ⎫ | 123 | 330 ⎫ | 360 | 2.3 |
| 10 | Solprene® 416  | 4.29(1.69) | 0.835 ⎭ |       | 121 ⎭ |     | 360 ⎭ |     |     |
| 11 | Solprene® 1205 | 4.06(1.60) | 0.848 ⎫ |       | 123 ⎫ |     | 320 ⎫ |     |     |
| 12 | Solprene® 1205 | 4.09(1.61) | 0.835 ⎬ | 0.848 | 121 ⎬ | 123 | 290 ⎬ | 347 | 2.2 |
| 13 | Solprene® 1205 | 4.04(1.59) | 0.862 ⎭ |       | 125 ⎭ |     | 430 ⎭ |     |     |
| 14 | Solprene® 417  | 4.14(1.63) | 0.814 ⎫ | 0.841 | 118 ⎫ | 122 | 490 ⎫ | 730 | 4.7 |
| 15 | Solprene® 417  | 4.04(1.59) | 0.862 ⎭ |       | 125 ⎭ |     | 970 ⎭ |     |     |
| 16 | Solprene® 418  | 4.06(1.60) | 0.848 | — | 123 | — | 750 | — | 4.8 |

Solprene is a registered trademark of Phillips Petroleum Company.
[a] 5 wt.% Solprene in asphalt.
[b] Radial Stress, Sr, is defined as the stress between a point within the specimen and outer circumference and is calculated according to the equation $$Sr = \frac{1}{t^2}(3.9.21 + 1.3344d)$$

where t = specimen thickness in inches and d = repeated deflection at the center of specimen in thousandths of an inch.
[c] Linear Failure, $N_f$, is defined as the number of cycles required before failure occurs.
[d] Improvement Factor defined as $N_f$ of polymer containing asphalt concrete specimen ÷ $N_f$ of asphalt concrete specimen containing no polymer.

TABLE II

Flexural Fatigue Test Data on Polymer Additives in Asphalt B

| Specimen No. | Additive[a] | Thickness cm (in) | Radial Stress[b] MPa - Avg. | | Radial Stress[b] psi - Avg. | | Linear Failure, $N_f$[c] Cycles × 10³ - Avg. | | Improvement[d] Factor, Avg. |
|---|---|---|---|---|---|---|---|---|---|
| 1 | None           | 4.19(1.65) | 0.800 ⎫ |       | 116 ⎫ |     | 45 ⎫  |     |     |
| 2 | "              | 4.14(1.63) | 0.821 ⎬ | 0.814 | 119 ⎬ | 118 | 20 ⎬  | 32  | —   |
| 3 | "              | 4.14(1.63) | 0.814 ⎭ |       | 118 ⎭ |     | 31 ⎭  |     |     |
| 4 | Solprene® 417  | 4.09(1.61) | 0.835 ⎫ | 0.841 | 121 ⎫ | 122 | 130 ⎫ | 120 | 3.8 |
| 5 | Solprene® 417  | 4.06(1.60) | 0.848 ⎭ |       | 123 ⎭ |     | 110 ⎭ |     |     |

Solprene is a registered trademark of Phillips Petroleum Company.
[a] 5 wt.% Solprene® in asphalt.
[b] Radial Stress, Sr, is defined as the stress between a point within the specimen and the outer circumference and is calculated according to the equation $$Sr = \frac{1}{t^2}(309.21 + 1.3344d)$$

where t = specimen thickness in inches and d = repeated deflection at the center of specimen in thousandths of an inch.
[c] Linear Failure, $N_f$, is defined as the number of cycles required before failure occurs.
[d] Improvement Factor defined as $N_f$ of polymer containing asphalt concrete specimen ÷ $N_f$ of asphalt concrete specimen containing no polymer.

The data in Table I illustrate that when diene-styrene copolymers such as the Solprene® copolymer series is added to asphaltic concrete the resistance to fail or crack after repeated stress was enhanced as noted by the addition of Solprene® 414, 416 and 1205 (Specimens Nos. 5 through 13). This technique was reported in the patent literature and thus is well recognized. The surprising feature was when a radial teleblock copolymer having a diene-styrene ratio of at least 75 diene/25 styrene was employed such as Solprene® 417 and 418, Specimens Nos. 14–16. Here the improvement was twice that when other similar type copolymers were used and nearly five times that of the control where no polymer was present in the asphaltic concrete (Specimens Nos. 1–4). This improvement can be visualized graphically as shown in FIG. 1. The data were obtained using a 85–100 Pen asphalt of a particular lot and is referred to as Asphalt A.

Figure 2:
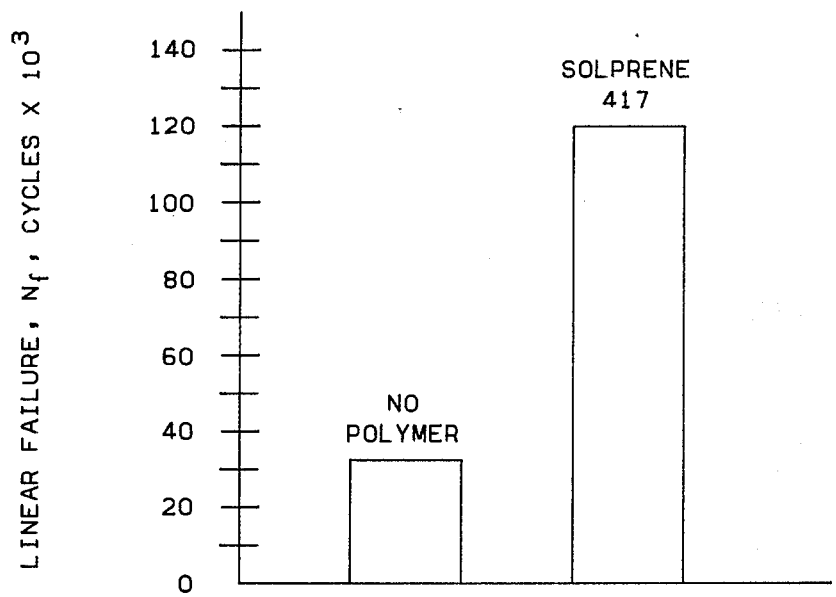

One of the copolymers (Solprene® 417, 80 parts diene/20 parts styrene), performing the best in Asphalt A, was then tested in another lot of 85–100 Pen asphalt referred to as Asphalt B. The data in Table II illustrate these same good results showing again an approximately four-fold improvement in resistance to failure. The data are visualized graphically as shown in FIG. 2.

The weight average molecular weight of the polymers usually will be in the approximate range of from about 50,000 to about 500,000. Presently, a weight average molecular weight in the range of from about 150,000 to 300,000 is preferred.

Reasonable variation and modification are possible within the scope of the foregoing disclosure and the appended claims to the invention the essence of which is that diene/vinyl aromatic copolymers, as described, have been found to significantly and also surprisingly to improve flex life and therefore service life of asphalt concrete compositions, also as described.

I claim:

1. An asphaltic concrete composition comprising an asphalt, a mineral aggregate, and a radial teleblock copolymer of a conjugated diene and a monovinyl aromatic monomer wherein the teleblock copolymer has a diene/monovinyl aromatic monomer weight ratio of at least about 75/25 to about 90/10 and a weight average molecular weight range of from about 150,000–300,000.

2. A composition according to claim 1 wherein the diene/monovinyl aromatic weight ratio of the teleblock copolymer is within the approximate range 80/20 to 85/15 and the weight average molecular weight is in the approximate range 190,000 to 300,000.

3. A composition according to claim 1 wherein the conjugated diene is selected from 1,3-butadiene and isoprene or mixtures thereof and the monovinyl monomer is styrene.

4. A composition according to claim 1 wherein the asphalt and the copolymer are admixed to obtain a homogeneous dispersion whereupon the mineral aggregate is then admixed with the dispersion thus obtained.

5. A composition according to claim 1 wherein the polymer weight average molecular weight is in the approximate range 130,000–300,000.

6. A composition according to claim 1 wherein the ingredients of the composition are as follows:

| Ingredient | Weight Percent |
|---|---|
| Mineral Aggregate | 96.95–77.0 |
| Asphalt | 3.0–20.0 |
| Radial Teleblock Copolymer | (2–15 parts per hundred asphalt) |

7. A composition according to claim 1 wherein the ingredients of the composition are as follows:

| Ingredient | Weight Percent |
|---|---|
| Mineral Aggregate | 95.3–91.2 |
| Asphalt | 4.5–8.0 |
| Radial Teleblock Copolymer | 0.20–0.80 |
| | (5–10 parts per hundred asphalt) |

8. A composition according to claim 2 wherein the ingredients of the composition are as follows:

| Ingredient | Weight Percent |
|---|---|
| Mineral Aggregate | 96.95–77.0 |
| Asphalt | 3.0–20.0 |
| Radial Teleblock Copolymer | (2–15 parts per hundred asphalt) |

9. A composition according to claim 2 wherein the ingredients of the composition are as follows:

| Ingredient | Weight Percent |
|---|---|
| Mineral Aggregate | 95.3–91.2 |
| Asphalt | 4.5–8.0 |
| Radial Teleblock Copolymer | 0.20–0.80 |
| | (5–10 parts per hundred asphalt) |

10. A composition according to claim 3 wherein the ingredients of the composition are as follows:

| Ingredient | Weight Percent |
|---|---|
| Mineral Aggregate | 96.95–77.0 |
| Asphalt | 3.0–20.0 |
| Radial Teleblock Copolymer | (2–15 parts per hundred asphalt) |

11. A composition according to claim 3 wherein the ingredients of the composition are as follows:

| Ingredient | Weight Percent |
|---|---|
| Mineral Aggregate | 95.3–91.2 |
| Asphalt | 4.5–8.0 |
| Radial Teleblock Copolymer | 0.20–0.80 |
| | (5–10 parts per hundred asphalt) |

12. A composition according to claim 4 wherein the ingredients of the composition are as follows:

| Ingredient | Weight Percent |
|---|---|
| Mineral Aggregate | 96.95–77.0 |
| Asphalt | 3.0–20.0 |
| Radial Teleblock Copolymer | (2–15 parts per hundred asphalt) |

13. A composition according to claim 4 wherein the ingredients of the composition are as follows:

14. A composition according to claim 5 wherein the ingredients of the composition are as follows:

| Ingredient | Weight Percent |
|---|---|
| Mineral Aggregate | 96.95–77.0 |
| Asphalt | 3.0–20.0 |
| Radial Teleblock Copolymer | (2–15 parts per hundred asphalt) |

15. A composition according to claim 5 wherein the ingredients of the composition are as follows:

| Ingredient | Weight Percent |
|---|---|
| Mineral Aggregate | 95.3–91.2 |
| Asphalt | 4.5–8.0 |
| Radial Teleblock Copolymer | 0.20–0.80 |
| | (5–10 parts per hundred asphalt) |

16. A composition according to claim 1 wherein the copolymer has been prepared using a coupling agent selected from silicon tetrachloride and polyepoxide.

17. A composition according to claim 2 wherein the diene is selected from 1,3-butadiene and isoprene or mixtures thereof and the monovinyl monomer is styrene.

18. A composition according to claim 3 wherein the copolymer is prepared using a coupling agent selected from silicon tetrachloride and polyepoxide.

19. A composition according to claim 1 wherein the conjugated diene is 1,3-butadiene, the monovinyl aromatic monomer is styrene and wherein silicon tetrachloride is used as a coupling agent in the preparation of the copolymer.

20. A composition according to claim 16 wherein the ingredients of the composition are as follows:

| Ingredient | Weight Percent |
|---|---|
| Mineral Aggregate | 96.95–77.0 |
| Asphalt | 3.0–20.0 |
| Radial Teleblock Copolymer | (2–15 parts per hundred asphalt) |

21. A composition according to claim 19 wherein the ingredients of the composition are as follows:

| Ingredient | Weight Percent |
|---|---|
| Mineral Aggregate | 95.3–91.2 |
| Asphalt | 4.5–8.0 |
| Radial Teleblock Copolymer | 0.20–0.80 |
| | (5–10 parts per hundred asphalt) |

* * * * *

UNITED STATES PATENT AND TRADEMARK OFFICE
CERTIFICATE OF CORRECTION

PATENT NO. : 4,217,259
DATED : Aug. 12, 1980
INVENTOR(S) : Clarence R. Bresson

It is certified that error appears in the above-identified patent and that said Letters Patent are hereby corrected as shown below:

Col. 9, line 33, Claim 8, in the col. "Weight Percent" insert --- 0.06-3.0 --- and move the line now there down.

line 52, Claim 10, in the col. "Weight Percent" insert --- 0.06-3.0 --- and mov e the line now there down.

Col. 10, line 8, Claim 12, in the col. "Weight Percent" insert --- 0.06-3.0 --- and move the line now there down.

line 11, Claim 13, after "follows:" the complete tabulation has been omitted, please insert --- 
| Ingredient | Weight Percent |
| --- | --- |
| Mineral Aggregate | 95.3-91.2 |
| Asphalt | 4.5-8.0 |
| Radial Teleblock Copolymer | 0.20-0.80 (5-10 parts per hundred asphalt) |

---.

Col. 10, line 18, Claim 14, in the col. "Weight Percent" insert --- 0.06-3.0 --- and move the line now there down.

line 52, Claim 20, in the col. "Weight Percent" insert --- 0.06-3.0 --- and move the line now there down.

Signed and Sealed this

Seventh Day of September 1982

[SEAL]

Attest:

GERALD J. MOSSINGHOFF

Attesting Officer

Commissioner of Patents and Trademarks